United States Patent [19]

Kudoh et al.

[11] Patent Number: 5,007,105
[45] Date of Patent: Apr. 9, 1991

[54] WATCH TYPE PAGING RECEIVER

[75] Inventors: Kazuhiro Kudoh, Tokyo; Toshirou Nishiyama; Sadayuki Anma, both of Shizuoka, all of Japan

[73] Assignee: NEC Corporation, Tokyo, Japan

[21] Appl. No.: 577,847

[22] Filed: Sep. 4, 1990

Related U.S. Application Data

[63] Continuation of Ser. No. 232,196, Aug. 15, 1988, abandoned.

[30] Foreign Application Priority Data

| Aug. 14, 1987 | [JP] | Japan | 62-201746 |
| Aug. 21, 1987 | [JP] | Japan | 62-206380 |
| Sep. 16, 1987 | [JP] | Japan | 62-229602 |
| Sep. 16, 1987 | [JP] | Japan | 62-229603 |

[51] Int. Cl.⁵ .......................... H04B 1/06; H04B 1/18
[52] U.S. Cl. ...................................... 455/344; 455/272; 455/351; 340/311.1; 343/718; 343/720
[58] Field of Search ............... 455/344, 347, 351, 269, 455/280, 283, 272; 340/311.1, 825.44, 825.46; 368/205; 343/702, 718, 720, 872

[56] References Cited

U.S. PATENT DOCUMENTS

| 3,032,651 | 5/1962 | Gisiger-Stähli et al. | 455/269 |
| 4,095,217 | 6/1978 | Tani et al. | 368/205 |
| 4,225,965 | 9/1980 | Baugh | 340/825.44 |
| 4,261,049 | 4/1981 | Komiyama et al. | 368/205 |
| 4,586,827 | 5/1986 | Hirsch et al. | 455/351 |
| 4,633,519 | 12/1986 | Gotoh et al. | 455/277 |
| 4,713,808 | 12/1987 | Gaskill et al. | 370/94 |
| 4,786,902 | 11/1988 | Davis et al. | 340/825.44 |

Primary Examiner—Benedict V. Safourek
Assistant Examiner—Ralph Smith
Attorney, Agent, or Firm—Sughrue, Mion, Zinn, Macpeak & Seas

[57] ABSTRACT

A watch type paging receiver which may be put on person's wrist by a belt includes a body on which a display device such as a liquid crystal display device is provided. An inverted F-shaped main antenna is implemented by a part of the display device. A loop antenna is provided in addition to the main antenna and implemented by the belt. The main and loop antennas are selectively rendered active depending upon the level of a received signal. Even when the length of the belt is changed to suit person's wrist, accurate matching is established on the basis of the resulting length of the belt. A primary battery in the form of a solar battery and a secondary battery are associated with the receiver body and the belt, respectively. A vibration source which is adapted for tactual alerting forms a part of the belt.

25 Claims, 15 Drawing Sheets

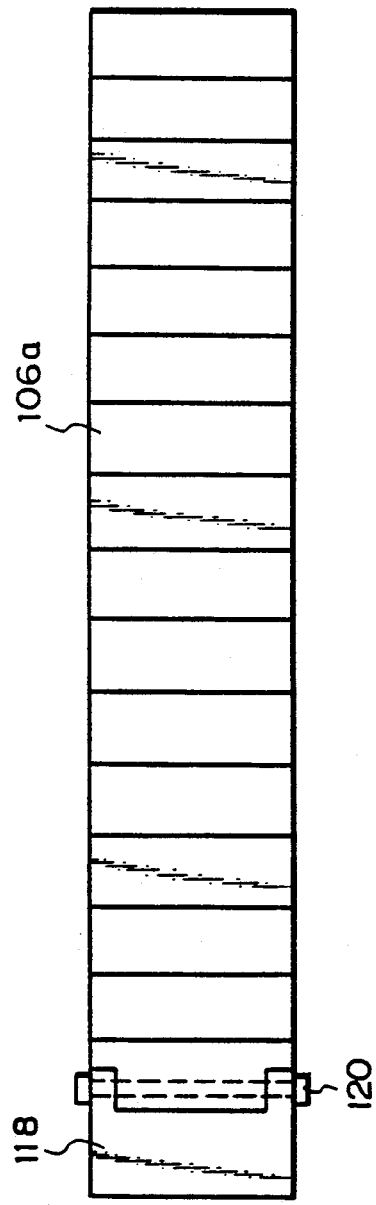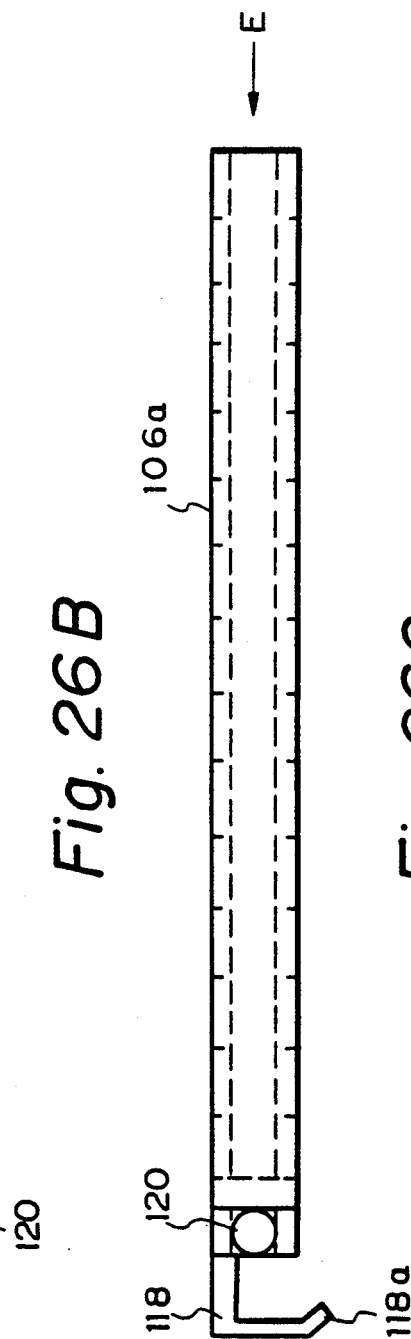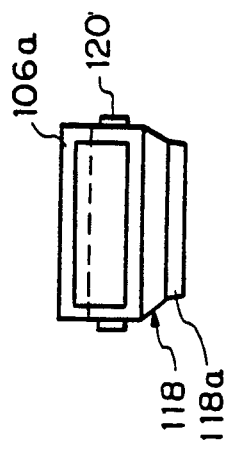

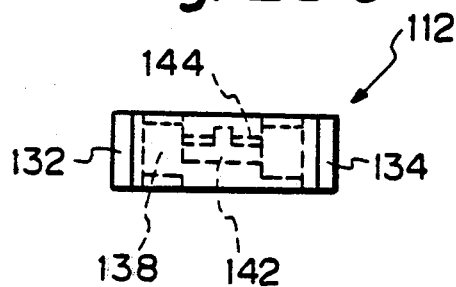
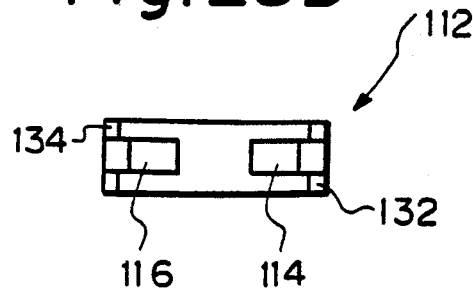
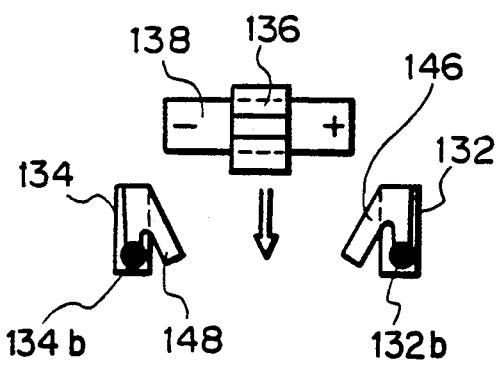
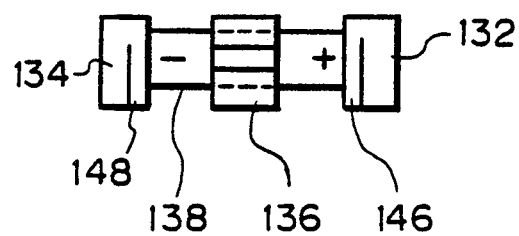
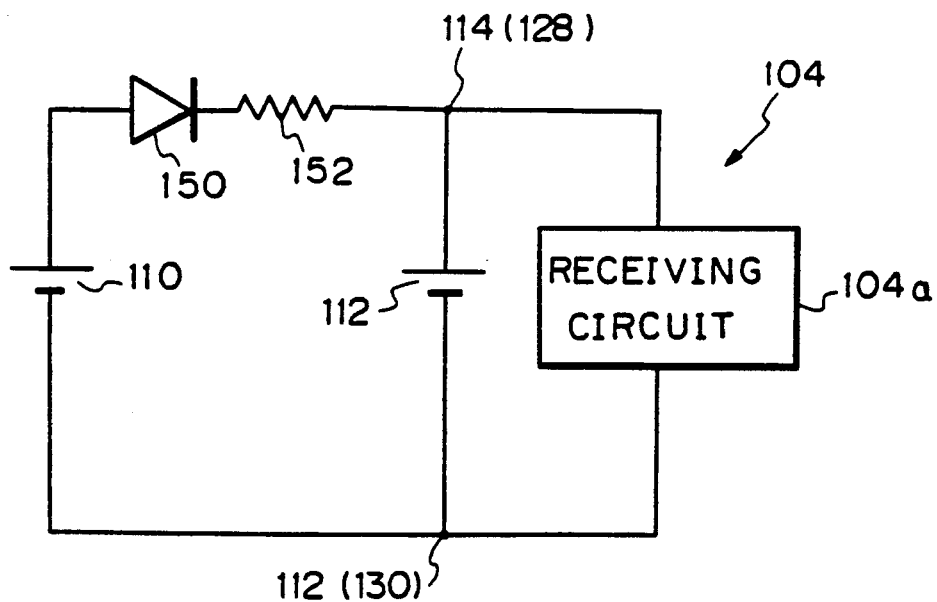

WATCH TYPE PAGING RECEIVER

This is a continuation of application Ser. No. 07/232,196 filed Aug. 15, 1988, now abandoned.

BACKGROUND OF THE INVENTION

The present invention relates to a miniature portable radio communication apparatus such as a paging receiver and, more particularly, to a watch type paging receiver which may be put on person's wrist by a belt.

In a miniature portable radio communication apparatus, a sufficient space is not available for an antenna because the casing of such an apparatus should be small enough to enhance portability. It has therefore been customary to use a loop antenna, ferrite antenna or like built-in antenna which has a highest possible antenna gain despite its miniature configuration and is hardly affected by a circuit board and others of the apparatus. Recently, however, the limitations on the position, size and shape of such a prior art built-in antenna have become much severer to meet the demand for further miniaturization of a radio communication apparatus, i.e. a small and thin apparatus casing. In such a situation, it is difficult to insure an antenna gain which is sufficiently high for usual reception.

Another problem with the prior art built-in antenna is that it is apt to electromagnetically couple with a circuit board, conductors and the like which surround it, failing to exhibit an expected antenna characteristic. When an antenna is installed together with a display section implemented by a liquid crystal display (LCD) device, for example, and a circuit board in the small and thin casing of a watch type paging receiver or similar portable radio communication apparatus which may be put on user's wrist by a belt, the characteristic of the antenna is necessarily degraded due to electromagnetic influence of the LCD device and circuit board. Eventually, a suitable space for accommodating the built-in antenna becomes unavailable.

An implementation for solving the above problem may be using the belt of the watch type paging receiver for an antenna. The belt may serve as a far larger antenna than the previously discussed built-in antenna and therefore achieves a high antenna gain. However, this brings about another problem because the length of the belt depends upon the person who uses the paging receiver. Specifically, should the length of the belt, or antenna, be changed, a matching circuit interposed between the antenna and a receiving circuit of the receiver will fail to establish accurate matching between the antenna and the receiving circuit.

Generally, a watch type paging receiver is provided with alerting means for alerting the user to the reception of a call. The alerting means may be in the form of a loudspeaker or an LCD device, a light emitting diode (LED) device or similar visual alerting means. Also known in the art is alerting means which uses vibration, i.e. tactual alerting means. This kind of alerting means is mainly applied to paging receivers of the type being carried in a pocket or on a waist belt and with which the space requirement is not so severe. The tactual alerting means has a vibration source which is bodily received in the receiver body so as to cause the entire receiver into vibration. However, using this kind of alerting means with a watch type paging receiver has hitherto been impractical because of the limited space available in such a receiver. More specifically, applying the tactual means to a watch type paging receiver will bring about the following problems.

(1) A single casing has to accommodate both of the receiver body and the vibration source and, yet, has to be as small as a watch, rendering the design extremely difficult.

(2) When the receiver body and the vibration source are installed in a single casing, the casing itself is heaviest and therefore cannot vibrate unless the vibration source has considerable power.

A prior art paging receiver to be carried in a pocket or on a waist belt is powered by a manganese dry cell which is relatively large size (e.g. AA: 7.34 cc or AAA: 3.85 cc). This kind of dry cell is available with ease and well adapts itself to such a paging receiver with respect to size and service life and, especially, space requirement. However, it is impractical to use a manganese dry cell with a watch type paging receiver whose space is limited. While such a manganese dry cell may be replaced with a button type manganese cell, the latter cannot power a watch type paging receiver over a long period of time because of its small capacity. Should a longer power source life be desired, the battery would become greater in size than the receiver body.

SUMMARY OF THE INVENTION

It is therefore an object of the present invention to provide a watch type paging receiver having an antenna which achieves a sufficient antenna gain for usual reception even in a limited space of a casing.

It is another object of the present invention to provide a watch type paging receiver which accurately matches an antenna and a receiving circuit thereof even if the antenna is implemented by a belt of the receiver and despite any change in the length of the belt.

It is another object of the present invention to provide a watch type paging receiver which includes tactual alerting means and yet has a small size and desirable portability.

It is another object of the present invention to provide a watch type paging receiver which has an ample space for accommodating a battery and therefore allows the use of a battery having a large capacity.

It is another object of the present invention to provide a generally improved watch type paging receiver.

A portable radio communication apparatus of the present invention comprises a body accommodating a receiving circuit of the apparatus, a display device provided on the body for displaying information, and a main antenna constituted by a part of structural members of the display device.

In a preferred embodiment of the present invention, the apparatus further comprises a loop antenna which is provided in addition to the main antenna and constituted by a belt of the apparatus.

BRIEF DESCRIPTION OF THE DRAWINGS

The above and other objects, features and advantages of the present invention will become more apparent from the following detailed description taken with the accompanying drawings in which:

FIG. 26A is a plan view showing the belt;

FIG. 26B is a side elevation of the same;

FIG. 26C is a view seen in a direction E of FIG. 26C;

FIG. 28C is the view from direction F of FIG. 28B;

FIG. 28D is the view from direction G of FIG. 28B;

FIGS. 29A and 29B are views each showing an implementation for fixing miniature cells which in combination constitute the secondary battery; and FIG. 30 is a schematic block diagram showing a power supply section which is constituted by the primary and secondary batteries together with a receiving circuit.

DESCRIPTION OF THE PREFERRED EMBODIMENTS

Preferred embodiments of the watch type paging receiver in accordance with the present invention will hereinafter be described in detail with reference to the accompanying drawings.

Figure 1:
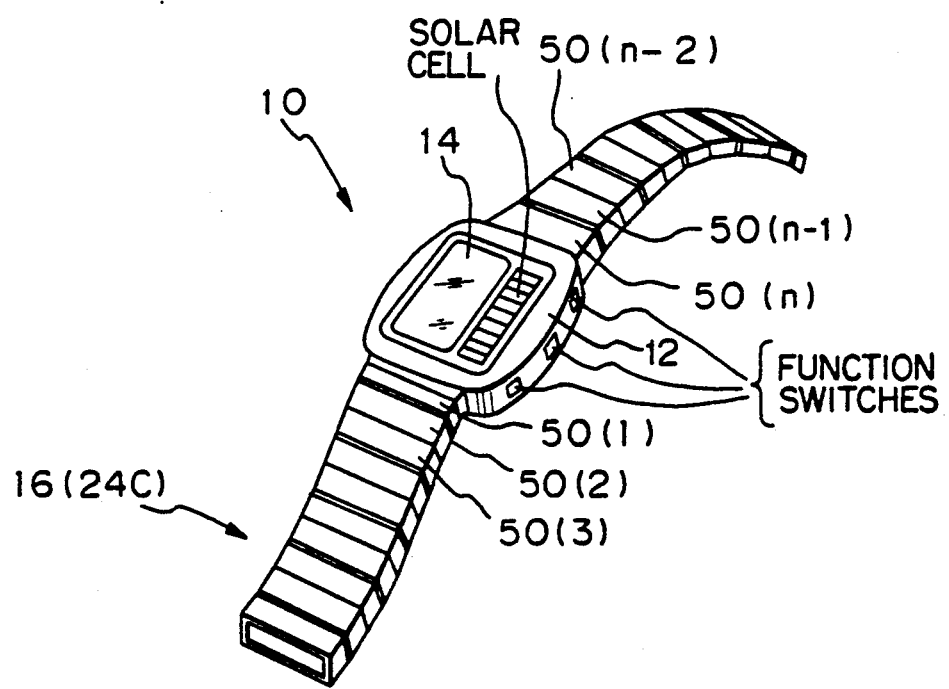
FIG. 1 is an external perspective view of a watch type paging receiver in accordance with the present invention.

Referring to FIG. 1, a paging receiver in accordance with the present invention is shown and generally designated by the reference numeral 10. As shown, the receiver 10 is generally made up of a receiver body 12 and a belt 16 for putting the receiver 10 on person's wrist. The receiver body 12 includes a display device 14 which may be implemented by a liquid crystal display (LCD) device. A receiving circuit is built in the receiver body 12 while an antenna of the receiver 10 is accommodated inside the display device 14. The belt 16 itself may constitute another antenna of the receiver 10. The two antennas may be used for diversity reception. For example, these antennas may be selectively used depending upon the level of a received signal while the receiver 10 is operated. Details of such antennas associated with the receiver 10 will be described hereinafter.

Figure 2:
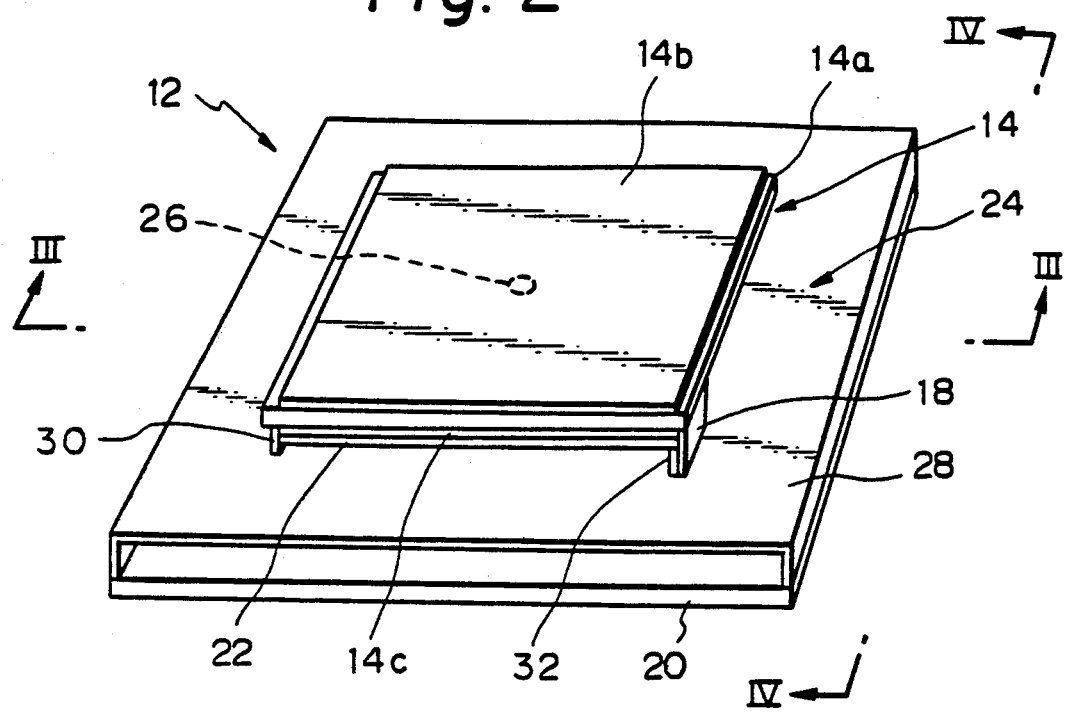
FIG. 2 is an external perspective view showing a first embodiment of an antenna which is built in the receiver of FIG. 1.
Figure 3:
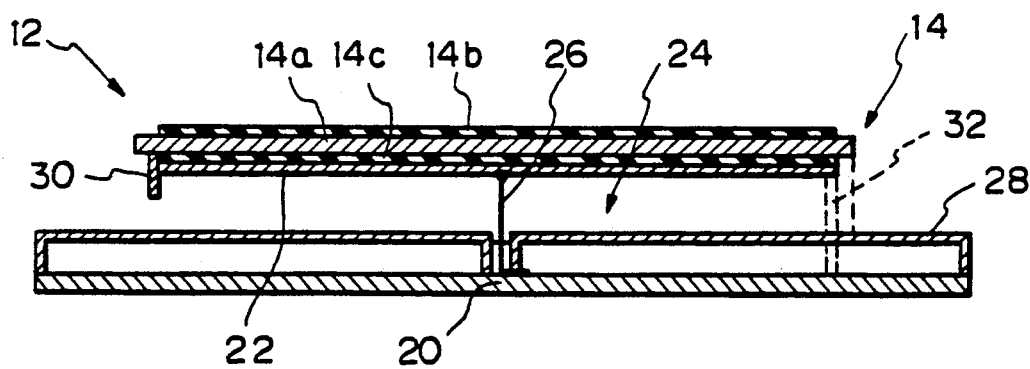
FIG. 3 is a sectional side elevation taken on line III—III of FIG. 2.
Figure 4:
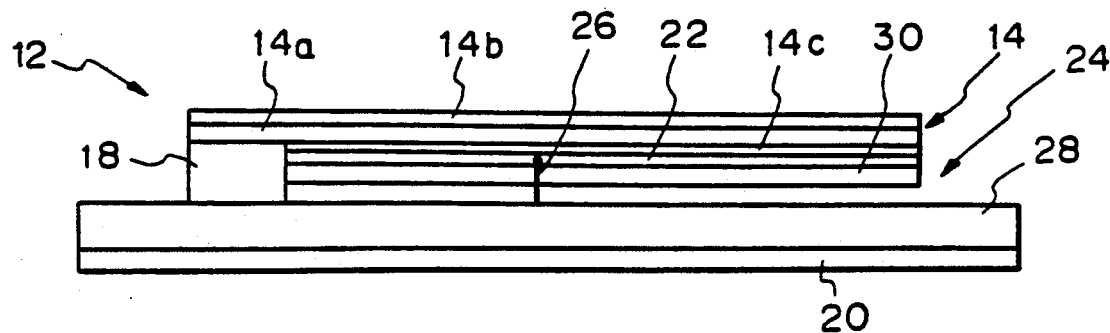
FIG. 4 is a side elevation taken on line IV—IV of FIG. 2.
Figure 5:
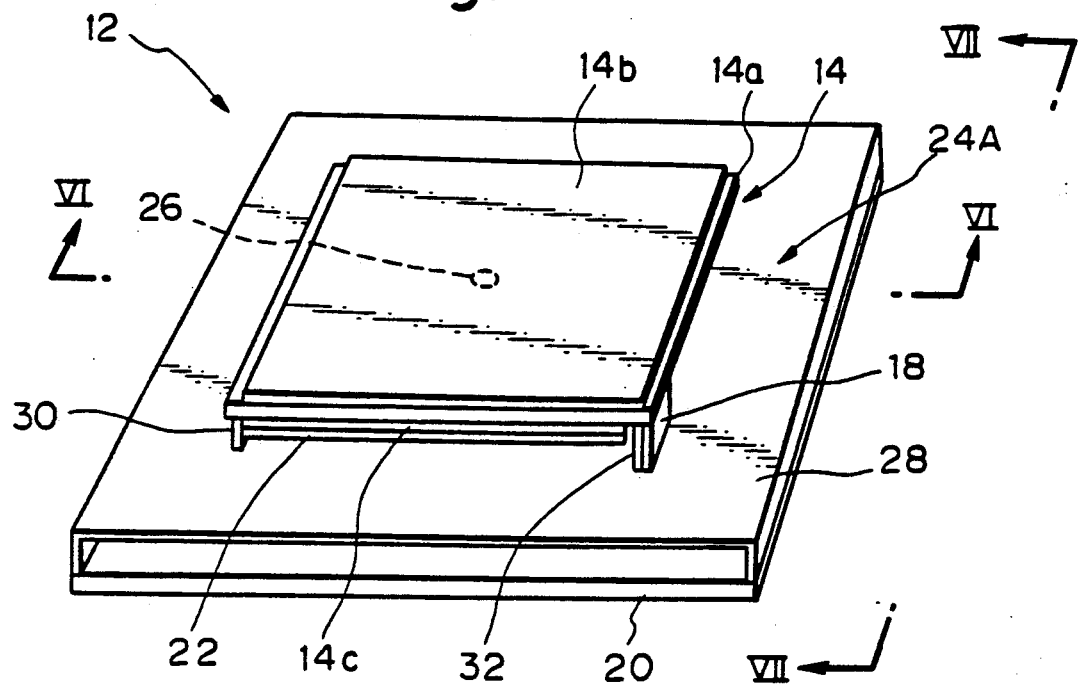
FIG. 5 is an external perspective view showing another embodiment of the built-in antenna.
Figure 6:
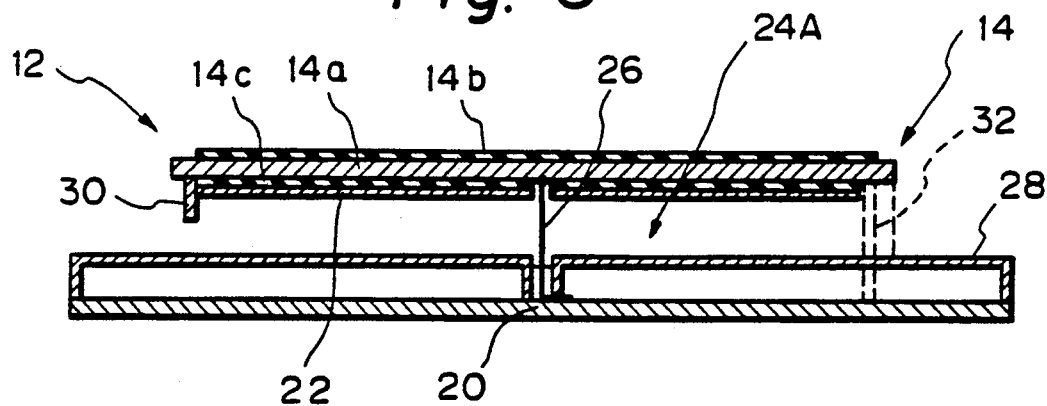
FIG. 6 is a sectional side elevation taken on line VI—VI of FIG. 5.
Figure 7:
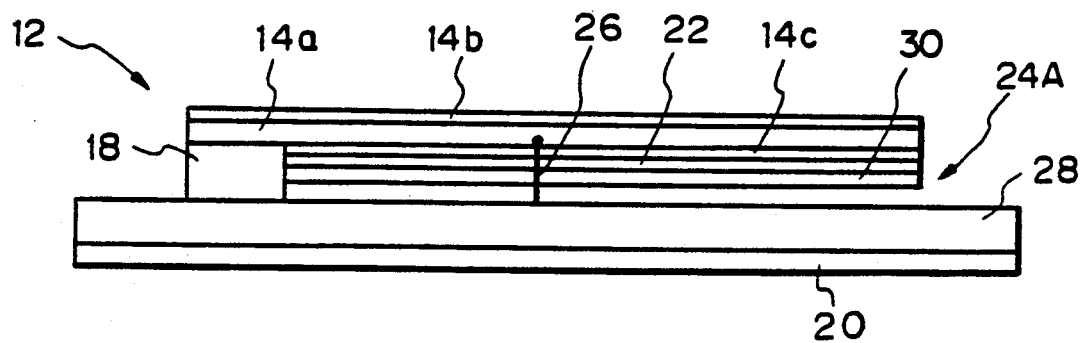
FIG. 7 is a side elevation taken on line VII—VII of FIG. 5.

Referring to FIGS. 2 to 4, a specific construction of the antenna which is built in the receiver body 12 is shown. As shown, the built-in antenna is generally in the form of an inverted letter F and mainly constituted by a reflector of the display device 14. Specifically, the display device 14 is constituted by an LCD device 14a comprising a liquid crystal substance and electrodes disposed above and below the substance, a transparent plate 14b, a glass plate 14c, and a flat reflector 22 which is optically reflective. The display device 14 is connected by an LCD connecting portion 18 to a circuit board 20 which is installed in the receiver body 12. The antenna, generally 24, is made up of the reflector 22, a feeder line 26, a base plate 28, a conductive plate 30, and a short-circuiting plate 32. The feeder line 26 is connected from the reflector 22 to a receiving circuit which is provided on the circuit board 20. The flat reflector 22 is connected by the short-circuiting plate 32 to the base plate 28. The antenna 24 is isolated from the receiving circuit on the circuit board 20 by the base plate 28. The LCD device 14a which constitutes the display device 14 is held in close contact with the back of the reflector 22 as viewed from the antenna 24 side and, hence, it hardly suffers from electromagnetic influence of the antenna 24. Although the short-circuiting plate 32 is formed narrower than the conductive plate 30 to lower the resonance frequency of the antenna 24, the LCD connecting section 18 has a minimum of influence on the characteristic of the antenna 24 because the connecting section 18 interconnects the display device 14 and the circuit board 20 along the short-circuiting plate 32.

Figure 8:
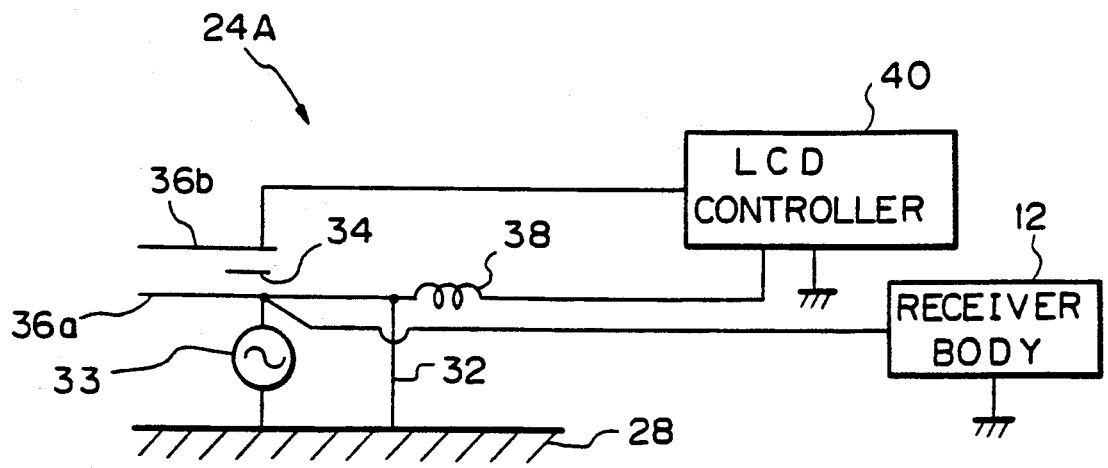
FIG. 8 is a schematic block diagram showing the antenna of FIG. 5 and an LCD device.
Figure 9:
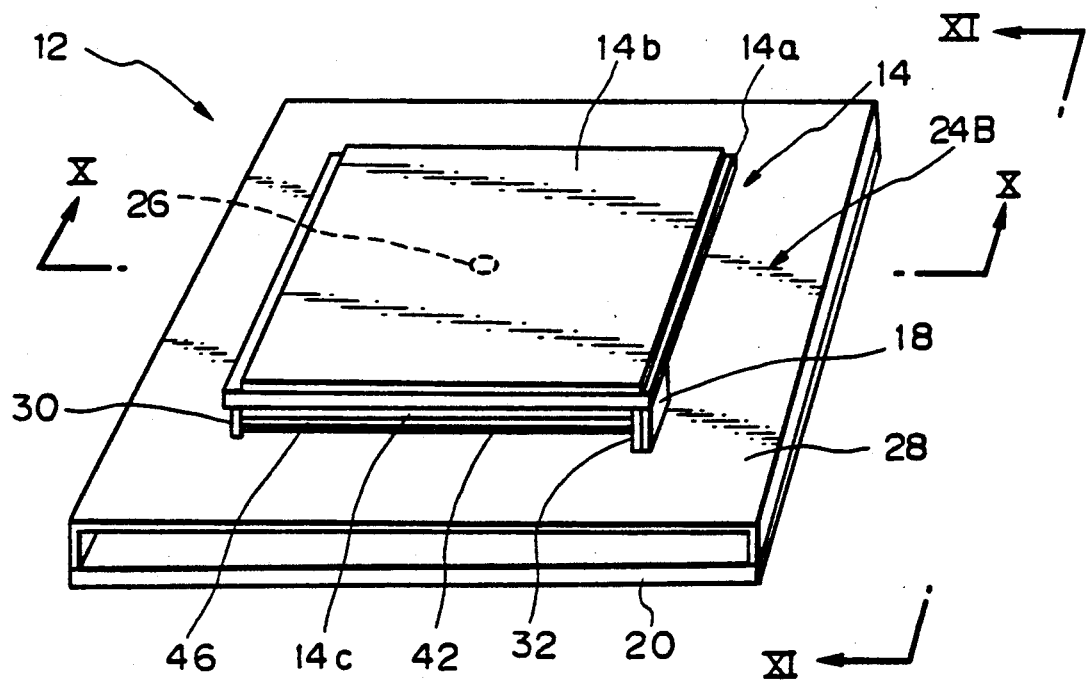
FIG. 9 is an external perspective view of a third embodiment of the built-in antenna.
Figure 10:
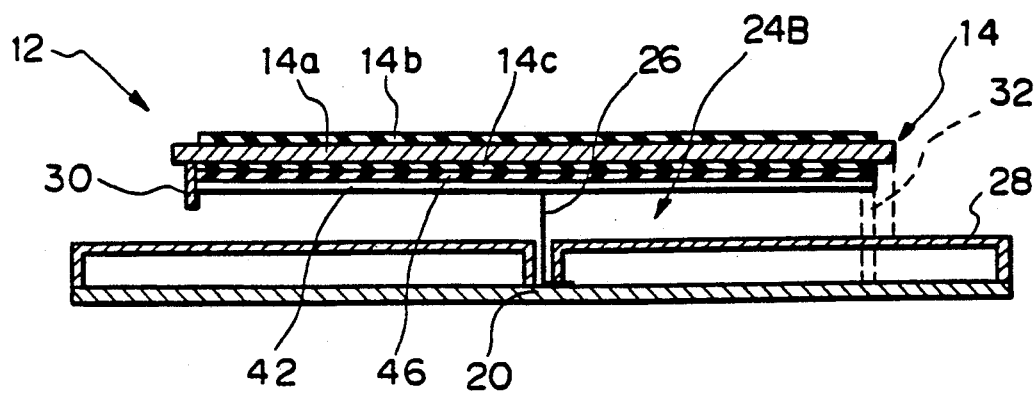
FIG. 10 is a sectional side elevation taken on line X—X of FIG. 9.
Figure 11:
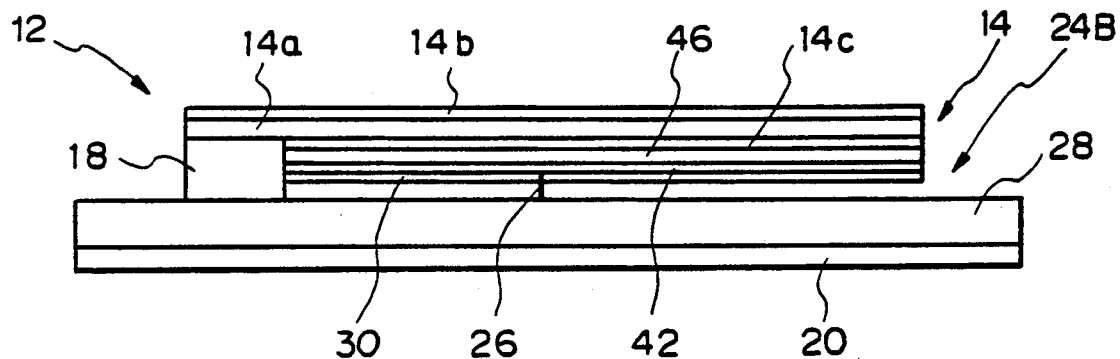
FIG. 11 is a side elevation taken on line XI—XI of FIG. 9.

Referring to FIGS. 5 to 8, another specific construction of the built-in antenna of the paging receiver 10 is shown. In FIGS. 5 to 8, the same or similar structural elements are designated by like reference numerals. As shown, the antenna 24A has a generally inverted F-shaped configuration as the above-described antenna 24, but the former is different from the latter in that not the reflector 22 of the display device 14 but electrodes of the LCD device 14a implement the antenna. More specifically, as shown in FIG. 8, a feeder section 33 feeds a high frequency to the receiver body 12. As mentioned above, the LCD device 14a includes a liquid crystal substance 34 and electrodes 36a and 36b which are disposed above and below the substance 34. An LCD controller 40 is isolated from the antenna 24A by a coil 38 with respect to high frequency, so that the liquid crystal substance 34 may be driven by the electrodes 36a and 36b by an alternating current whose frequency is lower than the high frequency of the antenna 24A.

Figure 12:
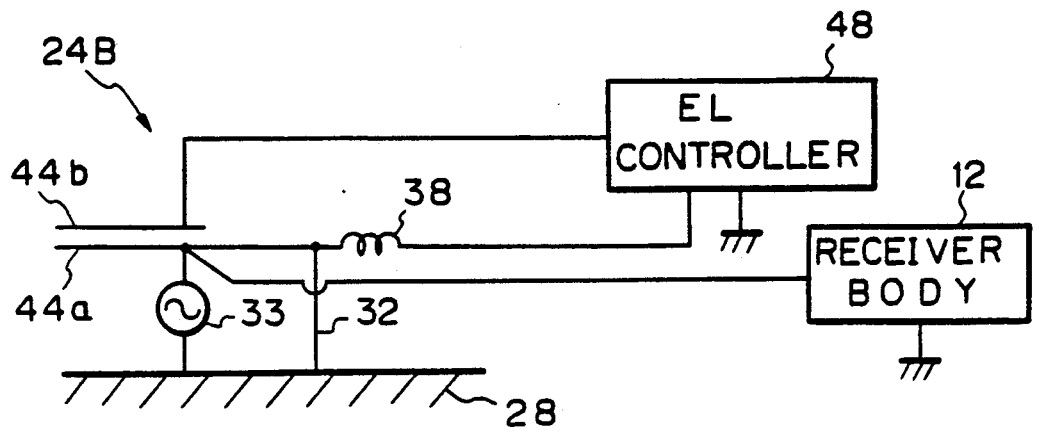
FIG. 12 is a schematic block diagram showing the antenna of FIG. 9 and an electroluminescence (EL) device.

Referring to FIGS. 9 to 12, still another specific construction of the built-in antenna of the paging receiver 10 is shown. In FIGS. 9 to 12, the same or similar structural elements as those of FIGS. 2 to 8 are designated by like reference numerals. The antenna, generally 24B, is also provided with an inverted F-shaped configuration and mainly implemented by an electrode of an electroluminescence (EL) device 42. Specifically, in this particular embodiment, the reflector 22 of the display device 14 is replaced with a semitransparent reflector 46, and the antenna 24B is constituted by the EL device 42 which underlies the LCD device 14a to serve the illuminating function. The LCD connecting portion 18 in this embodiment includes a connecting portion for the EL device 42. As shown in FIG. 12, the antenna 24B and an EL controller 48 for controlling the EL device 42 are interconnected by the coil 38, the EL controller 48 being isolated from the antenna 24B by the coil 38 with respect to high frequency. Again, this is because the EL device 42 is driven by applying an alternating current whose frequency is far lower than the high frequency to electrodes 44a and 44b of the EL device 42.

It will be seen from the above that the first to third specific constructions of the built-in antenna are each implemented by a part of a display device such as an LCD device or an EL device and a conductive plate which covers a circuit board, thereby insuring a sufficiently high antenna gain despite the miniature and thin configuration of a paging receiver.

Hereinafter will be described a specific construction of the antenna which is associated with the belt 16 of the paging receiver 10 in addition to the built-in antenna.

Figure 13:
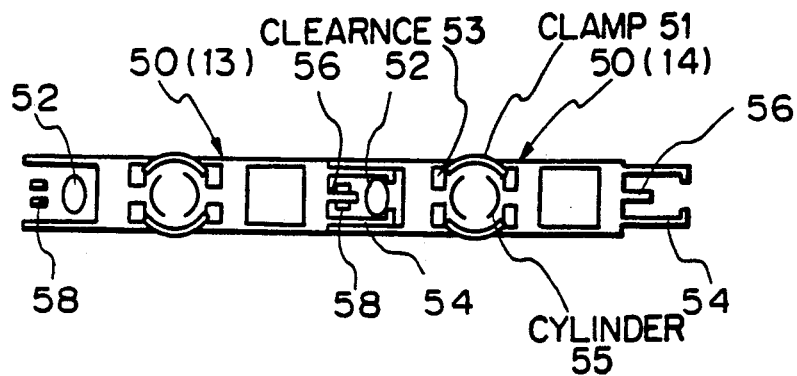
FIG. 13 is a side elevation showing how nearby modular units of an intermediate portion of a belt which is included in the receiver of FIG. 1 are interconnected.
Figure 14:
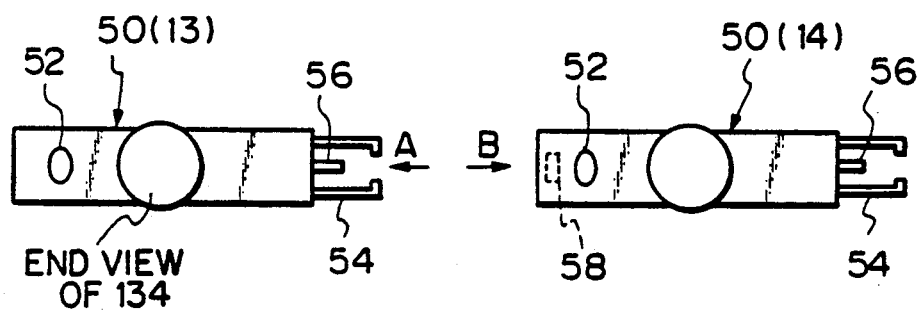
FIG. 14 is a front view showing the modular units of FIG. 13 in a separated condition.
Figure 15A:
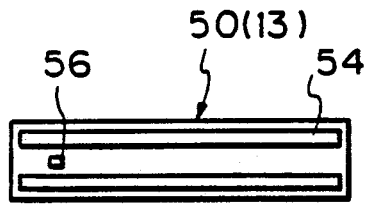
FIG. 15A and 15B are side elevations of the modular elements of FIG. 14 as viewed in directions A and B, respectively.
Figure 15B:

Referring again to FIG. 1, the belt 16 of the receiver 10 itself serves as a loop antenna 24C. As shown, the belt 16 is made up of a plurality of interconnected modular elements 50 (1) to 50 (n), and the elements 50 (1) and 50 (n) located at the opposite ends of the belt 16 are individually connected to the receiver body 12. FIG. 13 shows how intermediate modular elements such as 50 (13) and 50 (14) of the belt 15 are interconnected while FIG. 14 shows such modular elements 50(13) and 50(14) in a separated condition. As seen in FIG. 13, the clamp 51 enters the clearance 53 when the belt is bent. The cylinder 55 allows the belt to bend with clamp 51 sliding around cylinder 55. Further, FIGS. 15A and 15B show respectively those modular elements 50(13) and 50(14) which are viewed in directions A and B of FIG. 14. The intermediate elements 50(13) and 50(14) each comprises a connecting pin 52 and a hook-like connector 54 which is engageable with the connecting pin 52 of the counterpart. The elements 50(13) and 50(14) are mechanically jointed with their connecting pin 52 and connector 54 being engaged with each other. The elements 50(13) and 50(14) can be separated from each other simply by removing the connecting pin 52 off the connector 54 as needed. Each of the elements 50(13) and 50(14) further comprises a connecting pin 56 and a pin connector 58 with which the connecting pin 56 of the counterpart is to mate. The connecting pin 56 and pin connector 58 serve to establish electrical connection of the elements 50(13) and 50(14). The connector 54 also contributes to the electrical connection of the elements 50(13) and 50(14).

Figure 16:
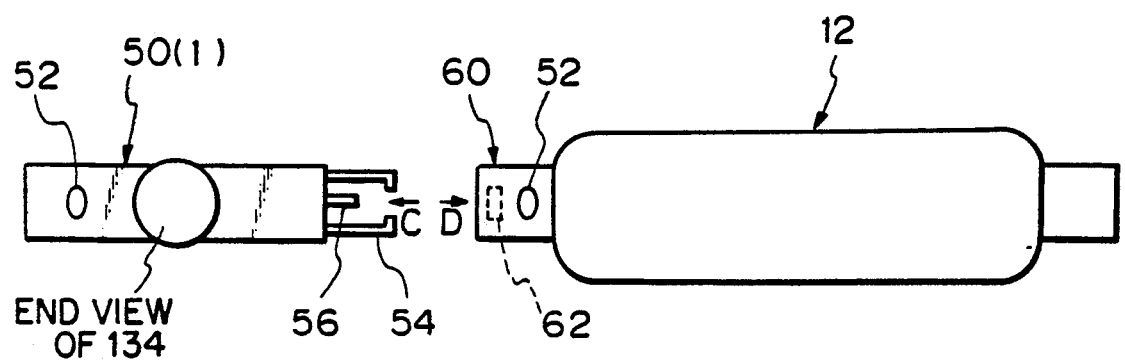
FIG. 16 is a front view showing a modular element which is located at one end of the belt and a receiver body to which the modular element is to be connected.
Figure 17A:
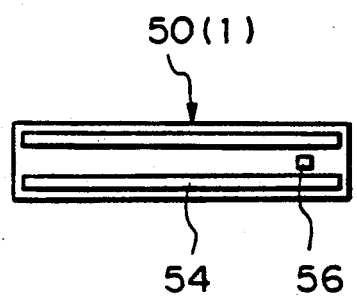
FIGS. 17A and 17B are front views showing respectively the modular element and the receiver body as seen in directions C and D of FIG. 16.
Figure 17B:
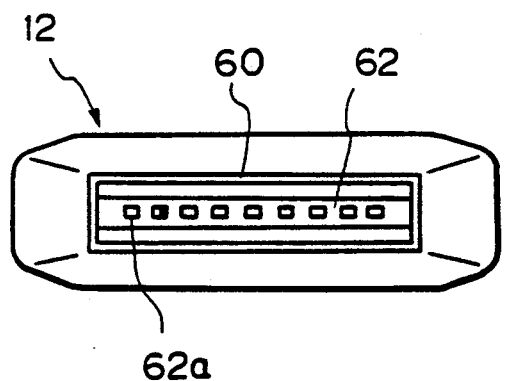

FIG. 16 shows an arrangement for connecting the modular element 50(1) which forms one end of the belt 16 to the receiver body 12. FIGS. 17A and 17B show respectively the element 50(1) and the receiver body 12 as viewed in directions C and D of FIG. 16. The element 50(1) also comprises a mechanical connecting pin 52, a connector 54, and an electrical connecting pin 56. The receiver body 12 is provided with a connecting portion 60 made of plastic or like non-conductive material which is to be jointed with the element 50(1). The mechanical connecting pin 52 is inserted in the connecting portion 60. The connector 54 of the element 50(1) is engageable with the pin 52 of the receiver body 12 to mechanically interconnect the element 50(1) and the receiver body 12. The receiver body 12 is further provided with a pin connector 62 which is to mate with the connecting pin 56 of the element 50(1), the pin connector 62 being formed with openings 62a for receiving the connecting pin 56 of the element 50(1) as will be described. When the connecting pin 56 is mated with the pin connector 62, the element 50(1) is electrically connected to the pin connector 62. It is noteworthy that the electrical connection of the element 50(1) and receiver body 12 is established by the pin connector 62 and openings 62a only, because the connecting portion 60 is formed from plastic or like non-conductive material.

Figure 18:
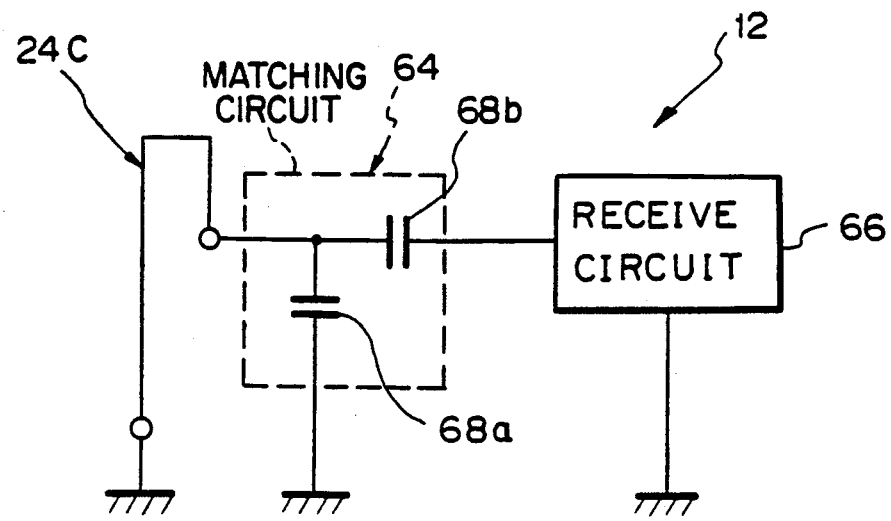
FIG. 18 is a schematic block diagram showing a matching circuit which is interposed between the antenna and a receiving circuit of the receiver.

Generally, a paging receiver of the type described accommodates in its body a matching circuit which functions to match an antenna and a receiving circuit. As shown in FIG. 18, the receiver body 12 also accommodates a single matching circuit 64 which is interposed between an antenna section 24C and a receiving circuit section 66 and made up of capacitors 68a and 68b. The matching circuit 64 is so designed as to adapt to the antenna 24C which is implemented as the belt 16 having a predetermined length. It follows that the matching circuit 64 will of course fail to operate as expected if the length of the belt 16 is changed to suit particular person's wrist.

Figure 19:
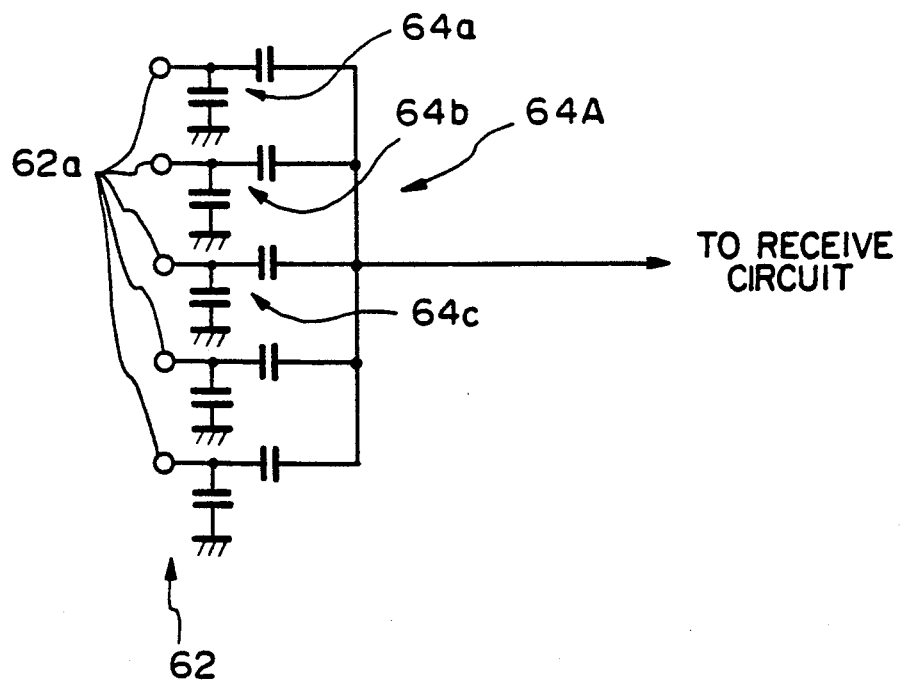
FIG. 19 is a circuit diagram schematically showing a matching circuit of the present invention which is built in a receiver body.

In light of this, the pin 56 of the element 50(1) which is adapted for electrical connection is provided in a particular position which is associated with the number of elements 50(1) to 50(n) of the belt 16. Specifically, the connecting pins 56 of at least those modular elements which are likely to directly connect to the receiver body 12 assume different positions from each other, and the pin connector 62 of the receiver body 12 is provided with a plurality of openings 62a accordingly. As shown in FIG. 19, the receiver body 12 accommodates therein a matching circuit 64A comprising matching units 64a, 64b, 64c, ... the number of which is associated with the number of modular elements 50(1) to 50(n) of the belt 16, each of the matching units 64 being associated with a respective one of the openings 62a. As shown in FIGS. 17A and 17B, assume that the element 50(1) is connected to the receiver body 12 as one end of the belt 16 when the length of the belt 16 is adjusted to suit a user whose wrist is relatively big. Then, the connecting pin 56 of the element 50(1) is connected by the opening 62a which is associated with the pin 56 to the matching circuit 64A which is made up of the matching units 64a, 64b, 64c, ... the number of which corresponds to the resulting length of the belt 16, i.e. antenna 24C. On the other hand, assume that one of the intermediate modular elements, e.g., 50(13) (see FIGS. 13, 14, 15A and 15B) is connected to the receiver body 12 as one end of the belt 16 when the length of the belt 16 is adjusted to suit another person whose wrist is relatively small. At this time, the connecting pin 56 of the element 50 (13) is connected by the opening 62a which is associated with the particular position of the pin 56 (i.e. rightmost opening 62a in FIG. 17B) to the matching circuit 64A having the matching units 64a, 64b, 64c, ... the number of which corresponds to such a particular length of the belt 16.

As stated above, the antenna 24C which is implemented as the belt 16 and the receiving circuit of the receiver can be desirably matched to each other despite any possible change in the length of the belt 16.

Figure 20:
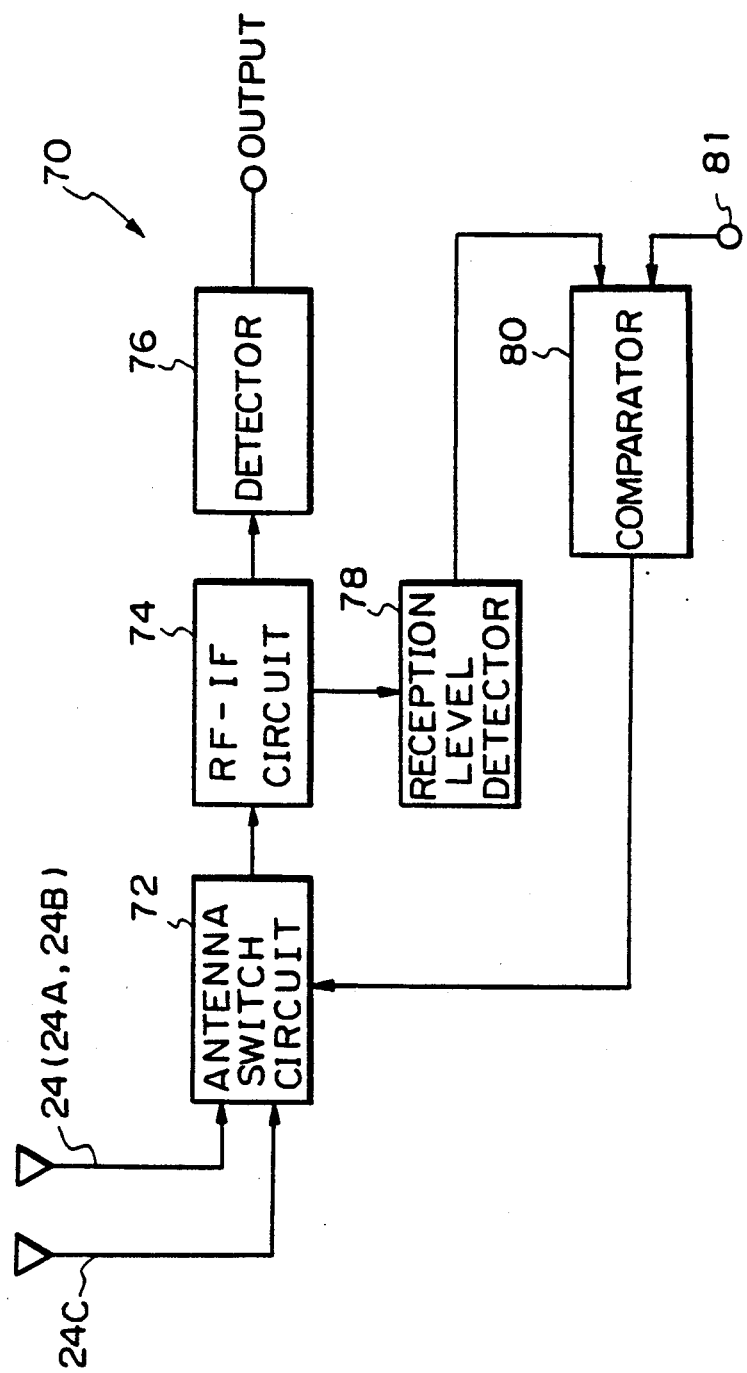
FIG. 20 is a schematic block diagram showing a circuit for selecting one of two antennas depending upon the level of a received signal.

Referring to FIG. 20, there is shown an antenna switching circuit 70 for selecting one of the two different antennas, i.e., the built-in antenna 24, 24A or 24B and the antenna 24C on the basis of the level of a signal received by the paging receiver 10. As shown, the antenna switching circuit 70 is made up of an antenna switch circuit 72, a radio frequency-intermediate frequency (RF-IF) circuit 74, a detector 76, a reception level detector 78, and a comparator 80. Connected to the antenna switching circuit 70 are the antenna 24, 24A or 24B which is housed in the receiver body 12 and the loop antenna 24C which is implemented as the belt 16 of FIGS. 1 and 13 to 18. The changeover of such antennas is effected when the actual reception level detected by the reception level detector 78 is lower than a predetermined reference level applied from a terminal 81. This kind of antenna switching technique is well known in the art and therefore will not be described any further herein.

The paging receiver in accordance with the present invention further includes alerting means as follows.

The paging receiver 10 of FIG. 1 may of course alert a user to the reception of a call by a loudspeaker which may be installed in the receiver body 12 or by the display device 14 which comprises an LDC device. In accordance with the present invention, the receiver 10 can be provided with extra alerting means which relies on vibration, i.e. tactual alerting means. Installing tactual alerting means in a watch type paging receiver has heretofore been impractical. Specifically, in accordance with the present invention, a vibration source for generating vibration forms a part of a belt of a paging receiver and is not built in a body of the receiver, as described in detail hereinafter.

Figure 21:
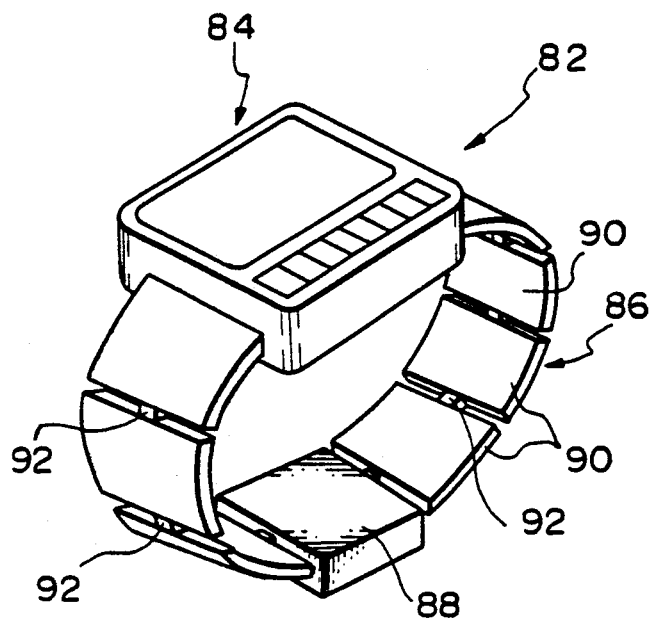
FIG. 21 is a perspective external view of a watch type paging receiver in accordance with the present invention in which a vibration source serving as alerting means is associated with a belt of the receiver.
Figure 22:
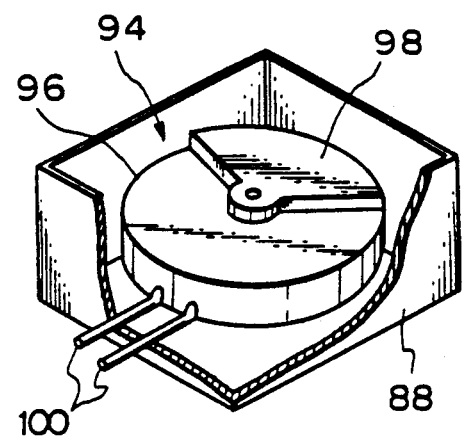
FIG. 22 is a perspective view showing a specific construction of the vibration source of as shown in FIG. 21.

Referring to FIG. 21, a paging receiver with tactual alerting means in accordance with the present invention is shown and generally designated by the reference numeral 82. As shown the receiver 82 generally comprises a receiver body 84 and a belt 86 which is fitted to the receiver body 84. The belt 86 is made up of a casing 88 which accommodates a vibration source therein and a number of vibrators 90 which are connected to the casing 88 by joints 92. When the vibration source and therefore the casing 88 associated therewith is caused to vibrate upon the reception of a call, it in turn causes the vibrators 90 and the joints 92 to vibrate to alert the user to the call. As shown in detail in FIG. 22, the vibration source 94 is implemented by a thin motor 96 which drives an eccentric rotor 98. Connected to the motor 96 is power supply cords 100 which extend from the receiver body 84 by way of the vibrators 90 and joints 92 for supplying power to the motor 96.

In operation, when a call arrives at the paging receiver 82, the receiver body 84 drives the thin motor 96 via the cords 100 with the result that the eccentric rotor 98 is rotated to generate vibration. Consequently, the entire belt 86 is caused to vibrate to inform the user of the reception of a call.

If desired, the tactual alerting means stated above may be combined with auditory alerting means such as a loudspeaker and visual alerting means which are installed in the receiver body 84. In such a case, an arrangement may be made such that only the auditory alerting means is held active while the receiver 82 is not put on user's wrist. The vibration source 94 is not limited to the eccentric rotor 98 and may alternatively be implemented by a piezoelectric element, for example.

It is to be noted that the casing 88 storing such a vibration source therein is applicable not only to the belt 86 of FIG. 21 but also to the belt 16 of FIG. 1.

Associating a vibration source with a belt is advantageous over accommodating it in a receiver body for the following reasons:

(1) the receiver body can be reduced in size;
(2) the receiver body and the belt are well balanced with respect to gravity because the vibration source forms a part of the belt, especially when the vibration source casing is positioned at the opposite side to the receiver body with respect to user's wrist;
(3) the decrease in the size of the receiver body and the improvement in balance are coupled to free a person from uncomfortableness; and
(4) since the belt is far lighter than the receiver body, the vibration source needed to alert a person to the reception of a call can be far smaller size than the vibration source which is installed in the receiver body.

Now, a paging receiver which is to be carried in a pocket or on a waist belt is generally powered by a relatively large manganese dry cell because some extra space is available in its body. However, it is almost impractical to accommodate such a dry cell in a watch type paging receiver whose space is severely limited. A paging receiver in accordance with the present invention is powered by a primary battery which is mounted in a body of the receiver and a secondary battery in the form of a number of miniature cells which are received in a belt of the receiver.

Figure 23:
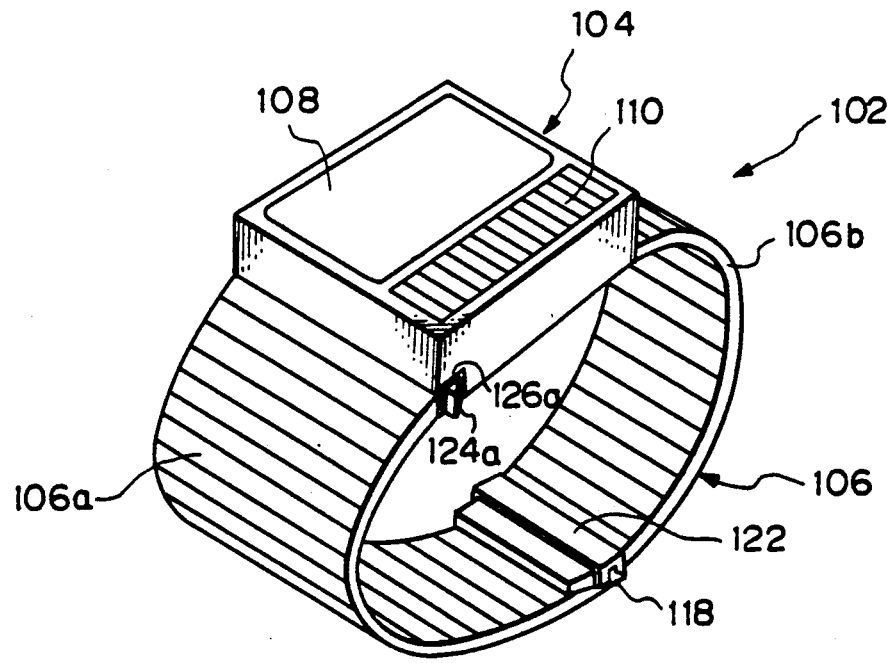
FIG. 23 is an external perspective view of a watch type paging receiver in accordance with the present invention which is powered by a primary battery mounted in the receiver body and a secondary battery received in a belt of the receiver.

Specifically, FIG. 23 shows a paging receiver in accordance with the present invention which is powered by a primary battery (solar battery) and a secondary battery as mentioned above. The paging receiver, generally 102, comprises a receiver body 104 and a belt 106 consisting of of two belt parts 106 and 106b which are mechanically connected to the receiver body 104. Mounted in the receiver body 104 are a display section 108 such as an LCD device and a solar battery 110 which serves as the primary battery. Various electrical circuits of the receiver are also built in the receiver body 104. The secondary battery is accommodated in the belt 106, as described hereunder in detail.

Figure 24:
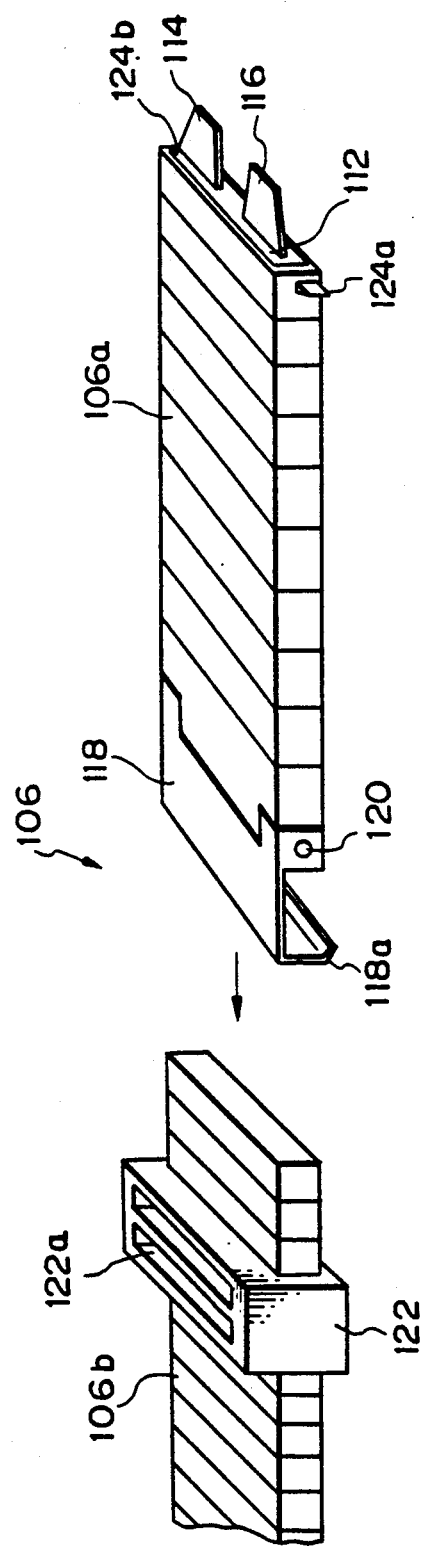
FIG. 24 is an external perspective view of the belt of the receiver which is shown in FIG. 23.
Figure 25:
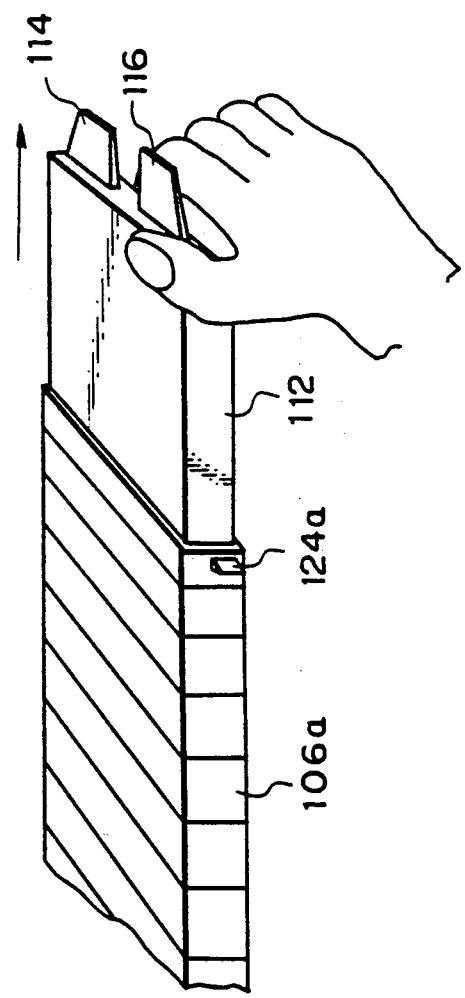
FIG. 25 is a perspective view showing how the secondary battery is removed from the belt for replacement.

FIG. 24 shows the belt 106 which is removed from the receiver body 104. As shown, one of the two belt parts such as the belt part 106a is at least partly formed hollow to accommodate a secondary battery 112 therein. The secondary battery 112 has a positive terminal 114 and a negative terminal 116. As shown in FIG. 25, the secondary battery 112 can be easily pulled out of the belt part 106a for replacement. One belt part 106a is provided with a locking member 118 at one end thereof. The locking member 118 is movable up and down about a pin 120 and provided with a hook-like free end 118a. A locking block 122 is slidablly fitted on the other belt part 106b. When the paging receiver is put on person's wrist, the belt parts 106a and 106b are firmly connected together by mating the locking member 118 and the locking block 122. The overall length of the belt 106 is adjustable to suit the user's wrist because the block 122 is slidable on and along the belt part 106b. The belt part 106a is shown in a plan view in FIG. 26A, in a side elevation in FIG. 26B, and in an elevation as seen in a direction E of FIG. 26C.

Figure 27:
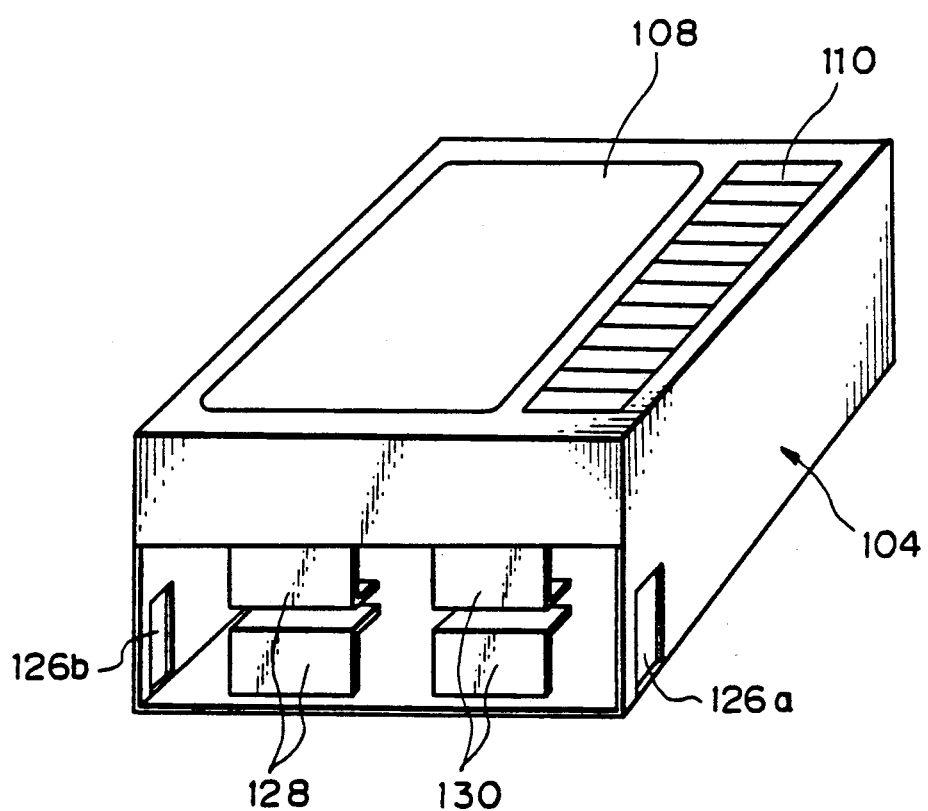
FIG. 27 is a perspective view showing the construction of the receiver body.
Figure 28A:
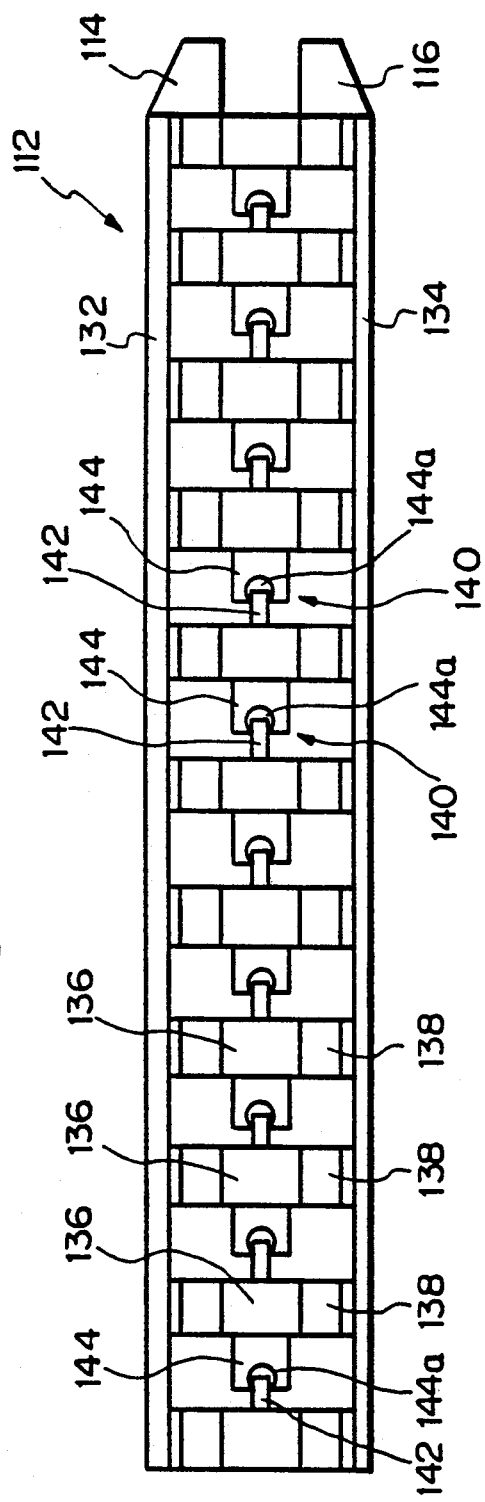
FIG. 28A is a plan view of the secondary battery.
Figure 28B:
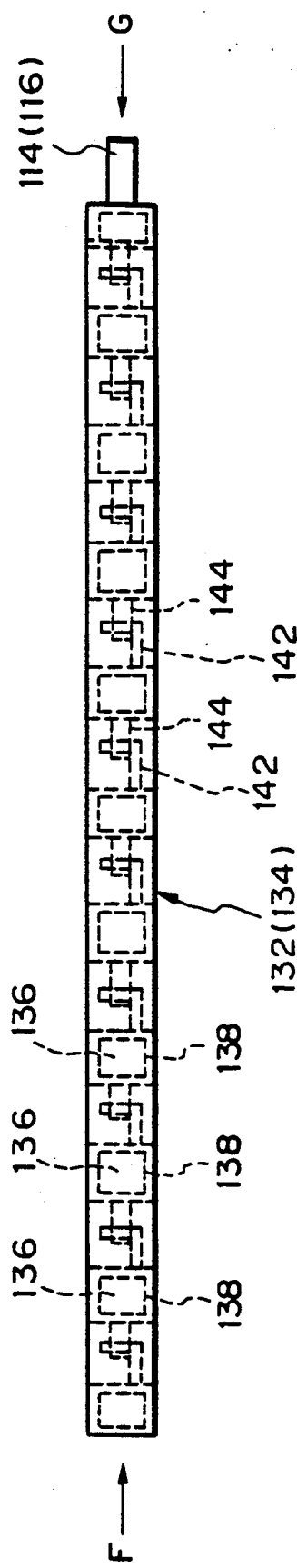
FIG. 28B is a side elevation of the secondary battery.

As shown in FIG. 24, the belt part 106a is provided with a pair of lugs 124a and 124b. On the other hand, as shown in FIG. 27, the receiver body 104 is provided with openings 126a and 126b. When the lugs 124a and 124b are respectively mated with the openings 126a and 126b, the belt 106 and the receiver body 104 are mechanically connected to each other. Further, the receiver body 104 is provided with a positive input terminal 128 and a negative input terminal 130 which are to electrically connect to, respectively, the positive output terminal 114 and the negative output terminal 116 of the secondary battery 112 when the belt 106 and receiver body 104 are connected together.

Referring to FIGS. 28A to 28D, a specific construction of the secondary battery 112 which is received in the belt part 106a is shown. Specifically, FIGS. 28A to 28D show the secondary battery 112 in a plan view, a side elevation, an elevation as seen in a direction F of FIG. 28B, and an elevation as seen in a direction G of FIG. 28B. As shown, the secondary battery 112 is made up of a deformable positive common terminal 132 made of copper and connected to the positive output terminal 114, a deformable negative common terminal 134 also made of copper and connected to the negative output terminal 116, holders 136 each holding a miniature cell 138, and connectors 140 for interconnecting the holders 136. Each of the connectors 140 consists of a hook-like connecting member 142 and a connecting member 144 formed with an aperture 144a for receiving the connecting member 142. As shown in FIG. 29A, flat resilient pieces 146 and 148 are respectively soldered to the positive and negative common terminals 132b and 134b so as to electrically connect and fix the positive and negative terminals of the individual cells 138. The cells 138 held by the holders 136 are individually engaged with the resilient pieces 146 and 148 to be fixed in place as shown in FIG. 29B.

Referring to FIG. 30, there is shown a power supply arrangement which includes the primary battery (solar battery) 110 and the secondary battery 112. As shown, the primary battery 110 transforms optical energy into electricity and feeds it to the secondary battery 112. The electricity stored in the secondary battery 112 is fed to a circuit section 104a of the receiver body 104. A diode 150 prevents the electricity stored in the secondary battery 112 from flowing toward the primary battery 110. A resistor 152 limits the current which flows from the primary battery 110 to the secondary battery 112. The positive and negative input terminals 128 and 130 of the receiver body 104 are respectively connected to the circuit section 104a and resistor 152 and the primary battery 110 and circuit section 104a. When the primary battery 110 is not mounted in the receiver body 104, the solar battery 110, diode 150 and resistor 152 shown in FIG. 30 will be absent.

In summary, the paging receiver 102 allows a cell to be accommodated at least in the belt 106 and therefore offers a greater space for a cell, promoting an increase in battery capacity. Furthermore, the battery stored in the belt 106 is readly removable for replacement and the space available in the receiver body can be effectively assigned to other circuits.

It is to be noted that the present invention is applicable not only to a watch type paging receiver as shown and described but also to any other type of miniature portable radio communication apparatus.

Various modifications will become possible for those skilled in the art after receiving the teachings of the present disclosure without departing from the scope thereof.

What is claimed is:

1. A portable radio communication apparatus comprising:
    a body accommodating a receiving circuit of said apparatus;
    display means with an optical reflector provided on said body for displaying information received by said receiving circuit; and
    a main antenna including said optical reflector connected to said receiving circuit constituted by a part of structural members of said display means.

2. An apparatus as claimed in claim 1, wherein said display means comprises a liquid crystal display (LCD) device.

3. An apparatus as claimed in claim 2, wherein said LCD device comprises a liquid crystal member, electrodes for driving said liquid crystal member, and a conductive reflector having an optical reflecting function.

4. An apparatus as claimed in claim 1, wherein said display means comprises an electroluminescence (EL) device.

5. An apparatus as claimed in claim 4, wherein said EL device comprises an illuminating member, electrodes for driving said illuminating member, and a semitransparent reflector constituting said optical reflector, said main antenna including said electrodes of said EL device.

6. An apparatus as claimed in claim 1, further comprising belt means for supporting said body.

7. An apparatus as claimed in claim 6, further comprising a loop antenna provided in addition to said main antenna and constituted by said belt means, and antenna switching means for selecting one of said main antenna and said loop antenna depending upon a level of a received signal.

8. An apparatus as claimed in claim 7, wherein said belt means comprises a plurality of modular elements the number of which is variable, said modular elements which are located at opposite ends of said belt means being individually connected to said body, at least one of said modular elements at opposite ends of said belt means being electrically connected to said receiving circuit of said body.

9. An apparatus as claimed in claim 8, wherein said modular elements each comprises a pin and a connector for mechanical connection and a pin and a connector for electrical connection, said pin for mechanical connection of one of said nearby modular elements being mechanically connected to said connector for mechanical connection of the other of said nearby modular elements and said pin for electrical connection of said one modular element being electrically connected to said connector for electrical connection of said other modular element.

10. An apparatus as claimed in claim 9, wherein said body comprises a pin connector engageable with said pin for electrical connection of said modular element which is to be connected to said body, a pin engageable with said connector for mechanical connection of said modular element, a plurality of openings with which said pin for electrical connection of said modular element is to mate, and matching means having matching units which are equal in number to said openings.

11. An apparatus as claimed in claim 10, wherein said pins for electrical connection of said modular elements which are to be connected to said body each assumes a particular position associated with the number of modular elements which are jointed together and is engageable with one of said openings which is associated with said particular position.

12. An apparatus as claimed in claim 6, further comprising alerting means which forms a part of said belt means.

13. An apparatus as claimed in claim 12, further comprising a vibration source, a casing accommodating said vibration source therein, and a number of vibrators which are connected to said casing, said belt means comprising said casing and said vibrators.

14. An apparatus as claimed in claim 13, wherein said vibration source comprises an eccentric rotor and a motor for driving said eccentric motor in a rotational motion.

15. An apparatus as claimed in claim 13, wherein said casing of said alerting means is located remotest from said body.

16. An apparatus as claimed in claim 6, further comprising a first power source provided in said belt means.

17. An apparatus as claimed in claim 16, further comprising a second power source accommodated in said body.

18. An apparatus as claimed in claim 17, wherein said first power source comprises a plurality of miniature cells and said second power source comprises a solar cell, said second and first power sources constituting primary and secondary batteries, respectively.

19. An apparatus as claimed in claim 18, wherein said secondary battery comprises holders each holding a respective one of said miniature cells, connectors jointing said holders to each other, and a positive and a negative common terminal respectively connected to positive and negative output terminals of said miniature cells.

20. An apparatus as claimed in claim 19, wherein said body comprises a positive and a negative input terminal which are electrically connectable to said positive and negative common terminals, respectively.

21. An apparatus as claimed in claim 19, wherein said belt means comprises a belt part in which a bore for accommodating said secondary battery is formed, and a locking member mechanically engageable with said body.

22. An apparatus as claimed in claim 21, wherein said body comprises an opening engageable with said locking member of said belt part.

23. A wristwatch type pager including a belt, comprising:
   a body accommodating a receiving circuit and supported by said belt;
   display means provided on said body for displaying information received by said receiving circuit;
   a main antenna formed as a part of the structural members of said display means;
   wherein said belt comprises a loop antenna; and
   said pager further comprises antenna matching circuit means coupled to said receiving circuit and to said loop antenna and having an adjustable matching capacitance for matching the loop antenna of said belt to said receiving circuit, said capacitance changing in accordance with the length of said belt.

24. A wristwatch type pager as claimed in claim 23, wherein said belt comprises a plurality of modular elements the number of which is variable, said modular elements which are located at opposite ends of said belt being individually connected to said body, at least one of said modular elements at opposite ends of said belt means being electrically connected to said receiving circuit of said body,
   wherein said modular elements each comprises a connector for electrical connection situated at a preselected location on said modular element according to an initial position in said belt, said body comprising an electrical connector for engaging the electrical connector of the modular element to be connected to the body, said electrical connector of said body having a plurality of connection points each connection point for mating with the electrical connector of a predetermined one of said modular elements, said antenna matching circuit means being in said body and comprising a plurality of matching circuits each connection point of said electrical connector of said body being connected to a respective one of said matching circuits.

25. A wristwatch type pager with a body and a belt, comprising:
   receiving circuit means accommodated in the body;
   loop antenna means to be coupled to said receiving circuit means;
   first connecting means coupled to said loop antenna means and representing the length of the belt;
   antenna matching circuit means for matching said loop antenna means to said receiving circuit means; and
   second connecting means connected to said first connecting means and to said antenna matching circuit means, the resonant frequency of said antenna matching circuit means being determined by the connection of said first and second connecting means.

* * * * *